United States Patent
Liu et al.

(10) Patent No.: US 7,206,300 B2
(45) Date of Patent: Apr. 17, 2007

(54) PERFORMANCE FOR INTEGRATED HOME AGENT AND FOREIGN AGENT

(75) Inventors: Changwen Liu, Portland, OR (US); Prakash Iyer, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1061 days.

(21) Appl. No.: 10/187,229

(22) Filed: Jun. 28, 2002

(65) Prior Publication Data
US 2004/0001473 A1 Jan. 1, 2004

(51) Int. Cl.
*H04Q 7/24* (2006.01)

(52) U.S. Cl. .................. 370/338; 370/349; 370/389

(58) Field of Classification Search ........ 370/310–328, 370/338–350, 389
See application file for complete search history.

(56) References Cited

U.S. PATENT DOCUMENTS

| | | | | |
|---|---|---|---|---|
| 6,856,624 | B2* | 2/2005 | Magret | 370/392 |
| 6,970,445 | B2* | 11/2005 | O'Neill et al. | 370/338 |
| 2002/0009066 | A1* | 1/2002 | Shimizu et al. | 370/338 |
| 2003/0053453 | A1* | 3/2003 | Ono et al. | 370/389 |

OTHER PUBLICATIONS

Montenegro, G. (Sun Microsystems, Inc.); "Reverse Tunneling for Mobile IP, revised"; http://www.ietf.org/rfc/rfc3024.txt?number=3024; Jan. 2001; (29 pages).
Perkins, C. (Nokia Research Center); "IP Mobility Support for IPv4"; http://www.ietf.org/rfc/rfc3220.txt?number=3220; Jan. 2002; (92 pages).
Perkins, C. (IBM); "IP Encapsulation within IP"; http://www.ietf.org/rfc/rfc2003.txt?number=2003; Oct. 1996; (14 pages).

* cited by examiner

*Primary Examiner*—Chi Pham
*Assistant Examiner*—Phuc Tran
(74) *Attorney, Agent, or Firm*—Marger Johnson & McCollom, P.C.

(57) ABSTRACT

A method for correctly routing packets is described. The method includes receiving an encapsulated packet from a sending mobile node destined for a receiving mobile node. The method determines whether the encapsulated packet is from a mobile node with the recipient as its home agent (reverse tunneled packet), whether the inner packet is destined to a mobile node with the recipient as its foreign agent, and whether the packet had been received in a previous reception. If the answers for all the three are yes, the packet is then delivered to the receiving mobile node. If the answers are yes only for the first two questions, the packet is routed and transmitted away normally and a copy of the packet IP header is cached locally. For all other cases, the packet is routed and transmitted away normally.

17 Claims, 3 Drawing Sheets

Figure 3
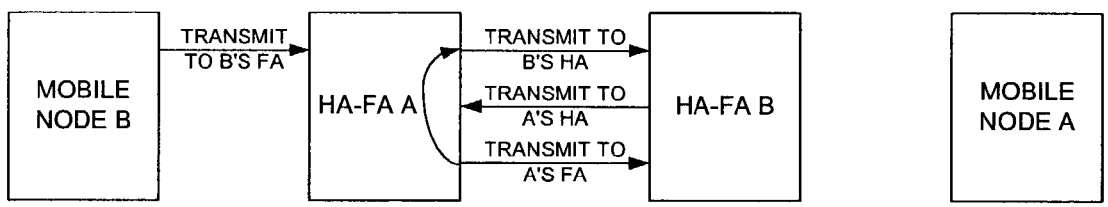
Figure 5
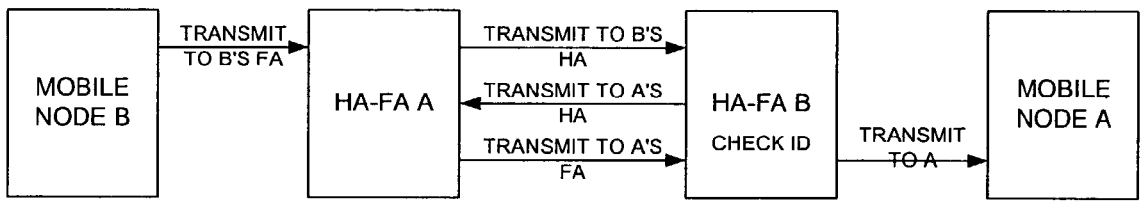
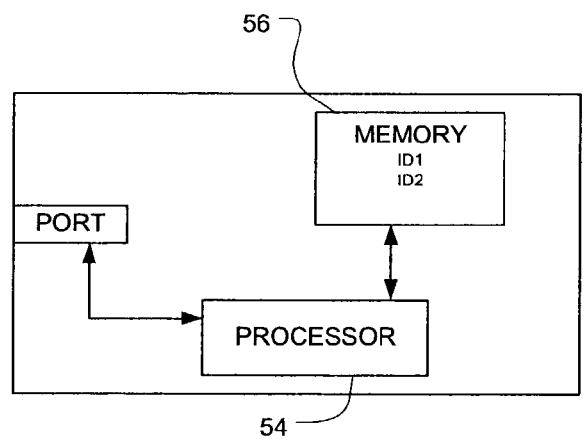
Figure 6

PERFORMANCE FOR INTEGRATED HOME AGENT AND FOREIGN AGENT

BACKGROUND

Mobile networking requires that a mobile device be able to communicate, even though the point of attachment to the network may change. This would normally cause problems, as most network addresses are associated with a fixed location. For a mobile device, referred to as a mobile node, to be truly mobile it would require a new network address each time it moved to a different location. This renders mobile networking impractical.

However, mobile networking solutions now exist. For example, for mobile networking using the Internet Protocol (IP) standard, there is a Mobile IP standard. This is disclosed in Request for Comments (RFC) published by the Internet Engineering Task Force (IETF), RFC 2002 and RFC 3220. This standard and other IP standards may serve as examples of the types of techniques used to overcome the fixed networking location requirement.

For example, in Mobile IP, a mobile node has a home agent assigned to it from its home network and a home address. As the mobile node roams away from its home network, the mobile node tells the address of its point of attachment to its home agent. The point of attachment address is referred to as the care-of address (CoA). The network at where the mobile node is attached is referred to as a foreign network, and routers at the foreign network that facilitate the packet transmission into and out of the mobile node are referred to as foreign agents. In some instances, a network may deploy foreign agents for use by mobile nodes from other networks, and home agents for use by mobile nodes on the network in the same device. This reduces the number of devices needed for mobile agent deployment.

BRIEF DESCRIPTION OF THE DRAWINGS

Embodiments of the invention may be best understood by reading the disclosure with reference to the drawings, wherein:

FIG. 3 shows an example of a routing loop.

FIG. 5 shows an embodiment of network routing with no routing loops.

FIG. 6 shows an embodiment of a network device capable of functioning as a home agent-foreign agent.

DETAILED DESCRIPTION OF THE EMBODIMENTS

Figure 1:
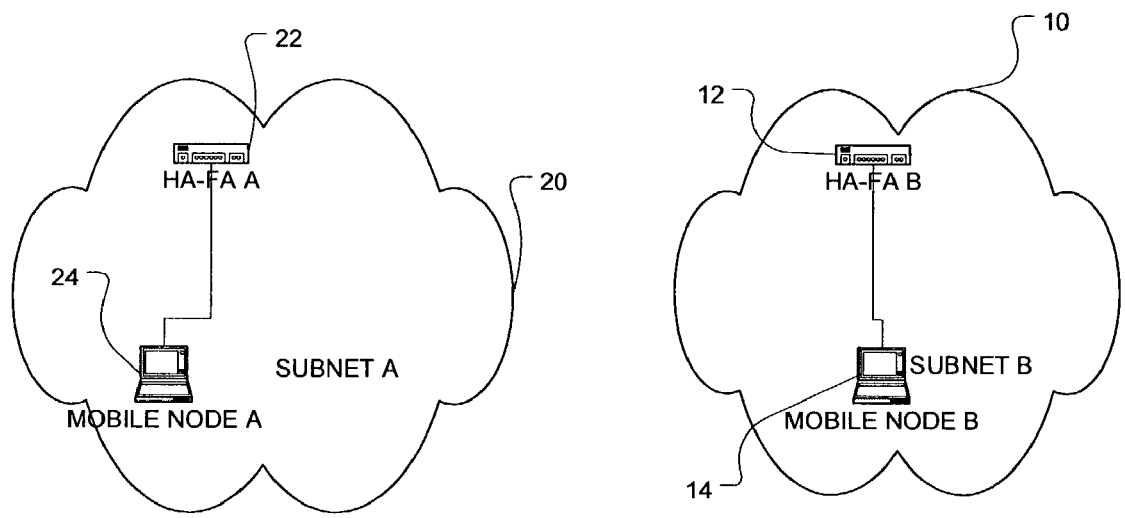
FIG. 1 shows an example of mobile nodes resident on their home networks.

FIG. 1 shows an example of two mobile nodes in their home networks. Subnet A, 20, has mobile node A 24, and a device that acts as a home agent 22, for mobile nodes such as mobile node A. When other mobile nodes roam into subnet A, the home agent 22 will act as a foreign agent for some of those mobile nodes. For better network efficiency, desirable functionality and conservation of hardware, the home agents often play this dual role of home agent-foreign agent, abbreviated at HA-FA, for example HA-FA A in Subnet A. Subnet B 10 has a similar arrangement with mobile node B and HA-FA B.

Figure 2:
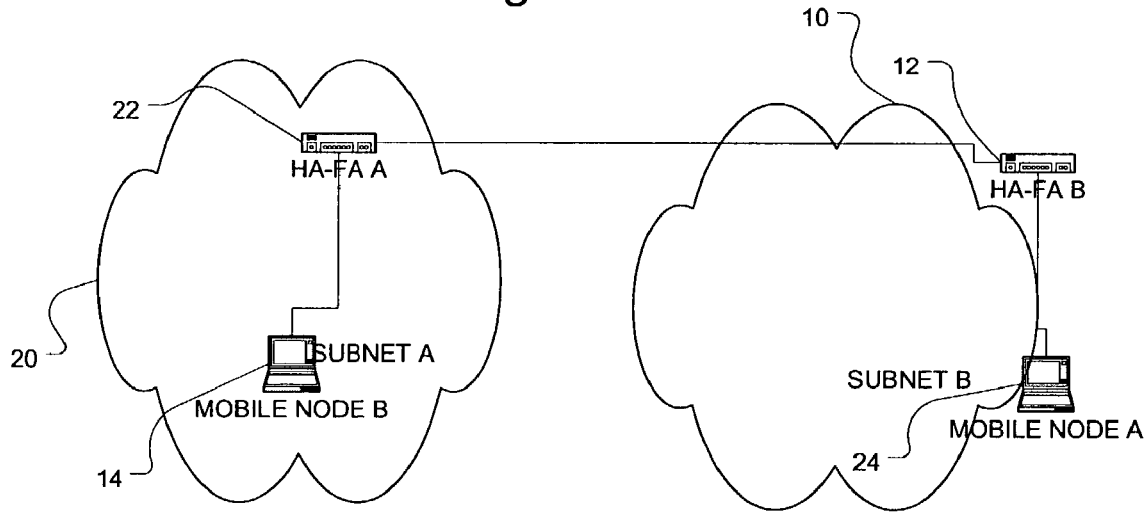
FIG. 2 shows an example of mobile nodes roaming into foreign networks.

As can be seen in FIG. 2, mobile node B 14 has roamed into subnet A and has registered with its home agent HA-FA B via HA-FA A. This registration process then causes HA-FA A to function as mobile node B's foreign agent. It is now employed in a dual role, as it continues to act as the home agent for mobile node A 24. Mobile node A makes a similar use of HA-FA B, employing it as the foreign agent of mobile node A, while HA-FA B continues to function as the home agent for mobile node B.

The home agent in mobile networking situations tunnels datagrams for delivery to the mobile node when it is away from home, and maintains current location information for the mobile node. For example, when mobile node B roams outside of its home network 10, it sends a care-of address (CoA) to the home agent HA-FA B 12 at mobile node B's home network 10. Packets destined to mobile node B will be intercepted by to the home agent. The home agent then forwards the packets to mobile node B's CoA. The foreign agent 22 provides mobile node B with the CoA and will forward the packets sent to B's CoA to mobile node B.

However, the dual roles played by the HA-FA devices can lead to packets that never reach their destination. Referring to FIG. 3, assume that mobile node B transmits a packet to mobile node A with the reverse tunneling requirement. Mobile node B transmits the packet to its own FA. In order to comply with the reverse tunneling requirement, the HA-FA A cannot act as in the HA role for mobile node A, so it must forward the packet to B's HA, HA-FA B.

HA-FA B then has two options. It can decapsulate the packet first and then route it to mobile node A's home agent HA-FA A. HA-FA B acts only as the home agent for mobile node B during this transaction. This leads to a routing loop, with the packet being passed between the two HA-FAs, and the packet never actually reaching mobile node A. The link between Subnet A and Subnet B becomes a 'black hole' for packets from mobile node B to mobile node A. Alternatively, HA-FA B could decapsulate the packet and deliver the decapsulated packet to mobile node A directly via a layer 2 mechanism, such as Ethernet (Institute of Electrical and Electronic Engineers standard 802.3), IEEE standard 802.11 wireless radio, and GPRS/3G radio. This presumes that mobile node A has previously registered with HA-FB A using HA-FA B as a foreign agent. In such a situation, mobile node A is assigned a "virtual" care-of IP address by HA-FA B and packets are forwarded between the 2 entities using their MAC addresses as destinations. This is in compliance with standard mobile IP behavior. However, this option has problems as well.

For example, assume that mobile node A roams out of subnet B but still has a valid entry in the visitor list at HA-FA B. If, in the above example, HA-FA B takes the second option and attempts to deliver to mobile node A directly, the packets will not reach mobile node A. Subnet B becomes a 'black hole' for packets from mobile node B to mobile node A until the entry for mobile node A in the visitor list for HA-FA B expires. In order for this to work, HA-FA B would have to resort to the first option and send the packet back to HA-FA A, which may lead to the routing loop discussed previously.

However it is possible to requires HA-FA B to take one of two possible options at a time: When HA-FA B receives a packet for the first time, it takes the first option and operates as mobile node B's home agent. When the packet is then sent back to HA-FA B again, it transmits the packet directly to mobile node A in its role as the foreign agent for mobile node A.

Figure 4:
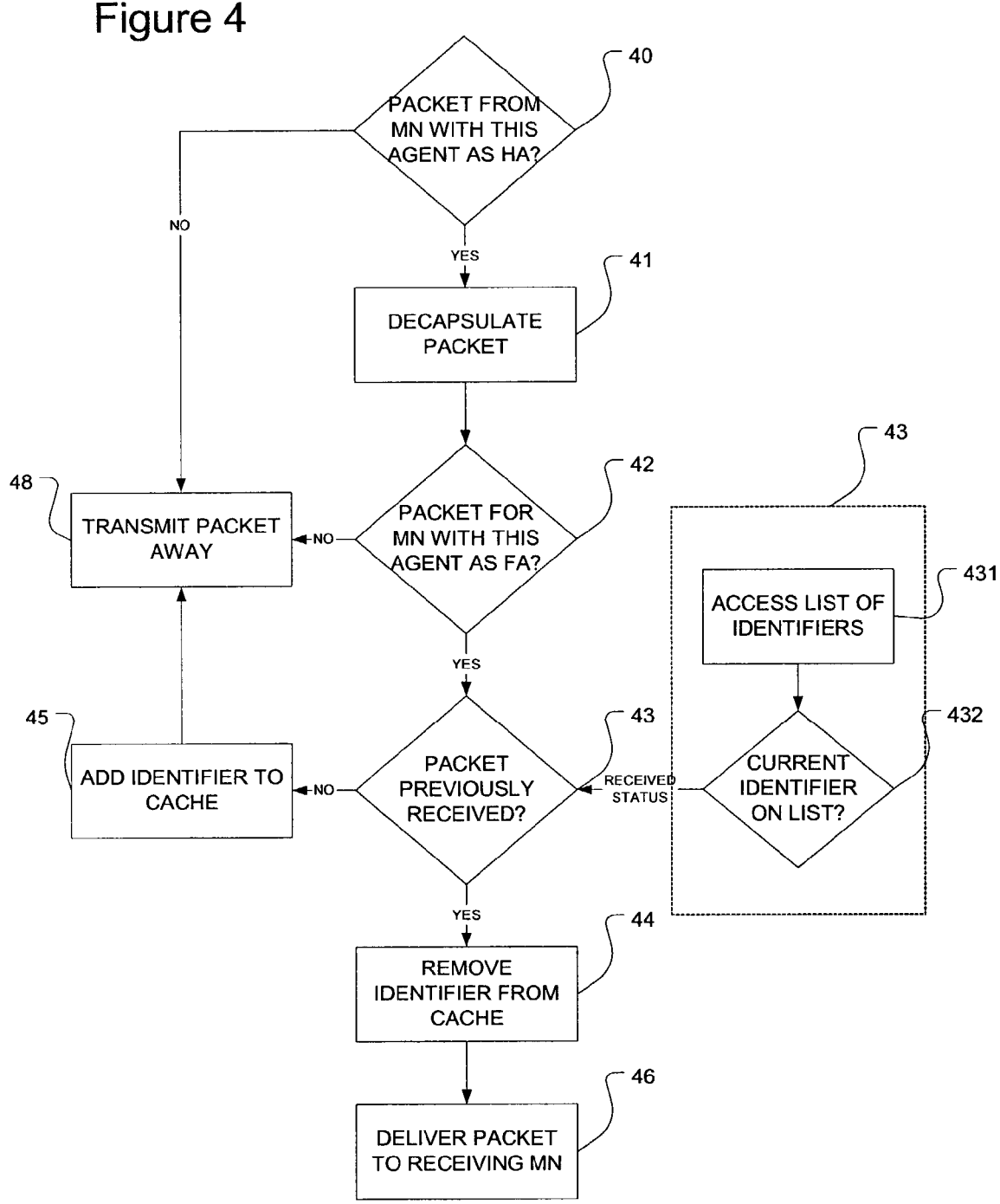
FIG. 4 shows a flowchart of an embodiment to avoid routing loops in mobile network.

In this way, the reverse tunneling requirement can be met, and the 'black hole' for packets can be eliminated. An embodiment of a method of improved routing for integrated home agents-foreign agents is shown in FIG. 4. A packet from a mobile node is received. At 40 and 42, the agent determines whether the packet is from a mobile node with this agent as its home agent and whether the decapsulated inner packet is destined to some mobile node with this agent as its foreign agent. At 43, the determination is made as to whether this packet had been previously received. 'Previously received' as used here indicates that the packet was received prior to this reception. If the packet had not been previously received, it performs normal IP routing for the inner packet without looking at its visitor list, and transmits away the packet towards its destination. If the packet had been previously received, the normal IP routing for the packet is bypassed and the packet is directly delivered to the receiving mobile node, mobile node A, at 46 in the example above. Direct delivery may be via layer 2 mechanisms.

The determination of how a packet is identified as having been previously received or not at 43 can be performed in several ways. In one embodiment shown in expanded box 43, a list of identifiers for packets may be maintained in a memory, such as a storage cache or other memory, in the network device. When a packet is received, the list is accessed at 431 and packet's identifier may be checked against the list at 432. The status of the packet then would determine whether it had been previously received. If the identifier approach is used, the identifier would be removed from the memory at 44 prior to delivery of the packet to the receiving mobile node at 46.

In terms of the Internet Protocol and the embodiment of tunneling, the transmitting end of the tunnel, in this case the mobile node, may fragment the packets. The receiving end will reassemble them. This results in this determination being made only for those packets already assembled. The assembled packets will typically have an inner IP header for the original packet and an outer IP header for the tunnel encapsulation. The inner IP header would be the identifier used in this example.

In addition to checking if the IP header, for example, were resident in the memory, the process reduces the necessity of accessing the memory by using two more criteria at 40 and 42. First, the packets that need to be examined will be those packets that are listing in the mobile binding list for the HA-FA to determine if the encapsulated packet is from a mobile node that has this HA-FA as its home agent. In the example above, mobile node B, the sending mobile node, has HA-FA B as its home agent. The mobile binding list is a list of the mobile nodes that use that HA-FA as their home agent, those mobile nodes° CoAs and the lifetime of that binding. Second, the visitor list for the HA-FA may be checked to determine that the receiving mobile node has the HA-FA as its foreign agent. The receiving mobile node in the above example, mobile node A, has the HA-FA B listed as its foreign agent. These simultaneous checks may be performed with the check on the existence of the identifier in the memory.

As can be seen in FIG. 5, application of this process eliminates the black hole that existed because of the routing loop before. The packet is transmitted from mobile node B to its home agent, HA-FA B. As this is an original reception, no record of that packet would be found at HA-FA B. HA-FA B then transmits it to mobile node A's home agent, HA-FA A. The identifier may be stored in a memory or some other mechanism used to identify that HA-FA B has received the packet as a first reception. HA-FA A would then transmit the packet to mobile node A's foreign agent, HA-FA B. HA-FA B would then check the packet identifier against the list stored in memory, or somehow identify that the packet has been previously received and then forwards the packet to mobile node A.

If the approach of storing the identifier is used, the identifier would be removed upon forwarding of the packet to mobile node A. This would keep the memory size small and limit the amount of additional overhead in the device. Alternatively, or in addition, the identifiers may be given an expiration period, after which they are removed.

In one embodiment, the memory for storing the identifiers would be provided as part of a network device that can operate as an integrated HA-FA. An example of such a device is shown in FIG. 6. The device 50 may be a router or other network device that offers mobility services such as home agent/foreign agent functions. A communications port 52 allows the device to receive packets from mobile nodes. A processor 54 is to access the memory 56, in which is stored the list of identifier according to one embodiment discussed above. The processor is also to determine if the identifier of the current packet is resident in the list, indicated that the packet was previously received. The processor then operates on the packet depending upon its received status.

Alternatively, an article of machine-readable code containing code that, when executed, performs the processes of embodiments of the invention could be provided. The code could be used to upgrade the operating instructions of existing machines and cause them to perform the methods of embodiments of the invention when those instructions are executed.

Thus, although there has been described to this point a particular embodiment for a method and apparatus for improved routing for network devices acting as integrated home agents/foreign agents, it is not intended that such specific references be considered as limitations upon the scope of this invention except in-so-far as set forth in the following claims.

What is claimed is:

1. A method for routing packets, the method comprising:
   receiving an encapsulated packet destined for a locally registered mobile node;
   determining if the encapsulated packet had been received in a previous reception; and
   if it had been received, delivering the packet to the locally registered mobile node and removing an identifier for the encapsulated packet from a memory.

2. The method of claim 1, wherein the method further comprises decapsulating the encapsulated packet and transmitting it, if the encapsulated packet had not been received in a previous reception.

3. The method of claim 1, wherein the method further comprises determining if the encapsulated packet was transmitted from a mobile node to a home agent for that mobile node.

4. The method of claim 1, wherein the method further comprises determining if the encapsulated packet was transmitted to a locally registered mobile node through a foreign agent.

5. The method of claim 1, wherein delivering the packet to the mobile node further comprises decapsulating the encapsulated packet, and delivering an inner packet to the mobile node.

6. The method of claim 1, wherein determining if the encapsulated packet had been received further comprises:

accessing a memory in which are stored a list of identifiers of previously-received packets; and determining if an identifier for the encapsulated packet is in the list.

7. The method of claim 1, wherein the identifier further comprises an Internet Protocol header.

8. A computer readable medium comprising program code that, when executed, causes the computer to:

determining if a received encapsulated packet had been received in a previous reception; and if it had been received, deliver the packet to the a mobile node and remove an identifier for the encapsulated packet from a memory.

9. The computer readable medium of claim 8, wherein the code, when executed, further causes the computer to:

decapsulate the encapsulated packet, resulting in an inner packet.

10. The computer readable medium of claim 8, wherein the code, when executed, further causes the computer to determine if the encapsulated packet was transmitted from a mobile node to a home agent for that mobile node.

11. The computer readable medium of claim 8, wherein the code, when executed, further causes the computer to determine if the encapsulated packet was transmitted to a mobile node through a foreign agent.

12. The computer readable medium of claim 8, wherein the code that causes the machine computer to determine if a received encapsulated packet had been received in a previous reception, further causes the computer to:

access a memory in which are stored a list of identifiers of previously-received packets; and determine if an identifier for the encapsulated packet is in the list.

13. A network device, comprising:

a port to allow the device to receive packets;

a memory to allow storage of identifiers of packets received by the network device; and a processor to:

access the memory to determine if a packet received by the network device had been received in a previous reception; and if the packet had been received in a previous reception, deliver the packet to a destination mobile node and remove an identifier of the packet from the memory.

14. The network device of claim 13, wherein the processor is further to decapsulate the packet and transmit it away from the destination mobile node if the packet had not been received.

15. The network device of claim 14, wherein the processor is further to store an identifier for the packet in a memory.

16. A communication system for providing communication for mobile nodes, the system comprising:

a first agent to route a packet from a first mobile node;

a second agent to receive the packets from the first agent and to determine if the packet had been previously received, to route the packet to a second mobile node if the packet has been previously received and to remove an identifier for the packet from a memory.

17. The communication system of claim 16, wherein the second agent is also to route the packet to the first agent if it had not been previously received.

* * * * *